T. M. WRIGHT.
RESILIENT HUB FOR WHEELS.
APPLICATION FILED JUNE 9, 1920.

1,390,226.

Patented Sept. 6, 1921.
2 SHEETS—SHEET 1.

Inventor
T. M. Wright,
By Watson E. Coleman
Attorney

T. M. WRIGHT.
RESILIENT HUB FOR WHEELS.
APPLICATION FILED JUNE 9, 1920.
1,390,226.
Patented Sept. 6, 1921.
2 SHEETS—SHEET 2.
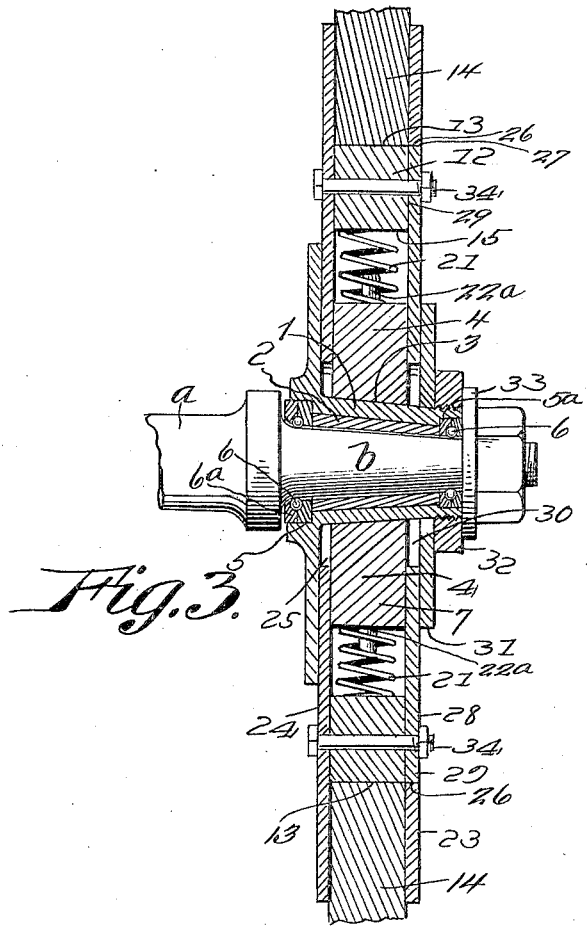
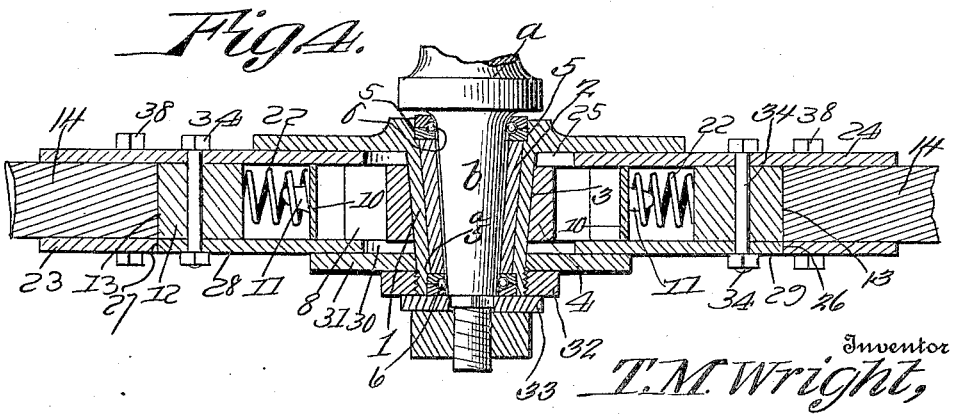
Inventor
T. M. Wright,
By Watson E. Coleman
Attorney

UNITED STATES PATENT OFFICE.

THOMAS M. WRIGHT, OF BERTRAM, TEXAS.

RESILIENT HUB FOR WHEELS.

1,390,226. Specification of Letters Patent. Patented Sept. 6, 1921.

Application filed June 9, 1920. Serial No. 387,597.

*To all whom it may concern:*

Be it known that I, THOMAS M. WRIGHT, a citizen of the United States, residing at Bertram, in the county of Burnet and State of Texas, have invented certain new and useful Improvements in Resilient Hubs for Wheels, of which the following is a specification, reference being had to the accompanying drawings.

This invention relates to an improved resilient hub for wheels and an object is to provide a device of this kind especially adapted for eliminating the use of pneumatic tires, wherein inner pneumatic tubes are utilized, and furthermore to provide a resilient hub whereby solid rubber tires may be used on the felly of the wheel.

Another object embodies a device of this kind which is simple, efficient and practical in construction and can be cheaply made and sold at a reasonable profit, and furthermore, the invention resides in a hub wherein the resilient means is mounted, and with which the axle coöperates to absorb the shocks, and in order to yieldably support the body of the vehicle.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Fig. 3 is a vertical sectional view on line 3—3 of Fig. 2; and

Fig. 4 is a sectional view on line 4—4 of Fig. 2 at right angles to that shown in Fig. 3;

Figure 1:
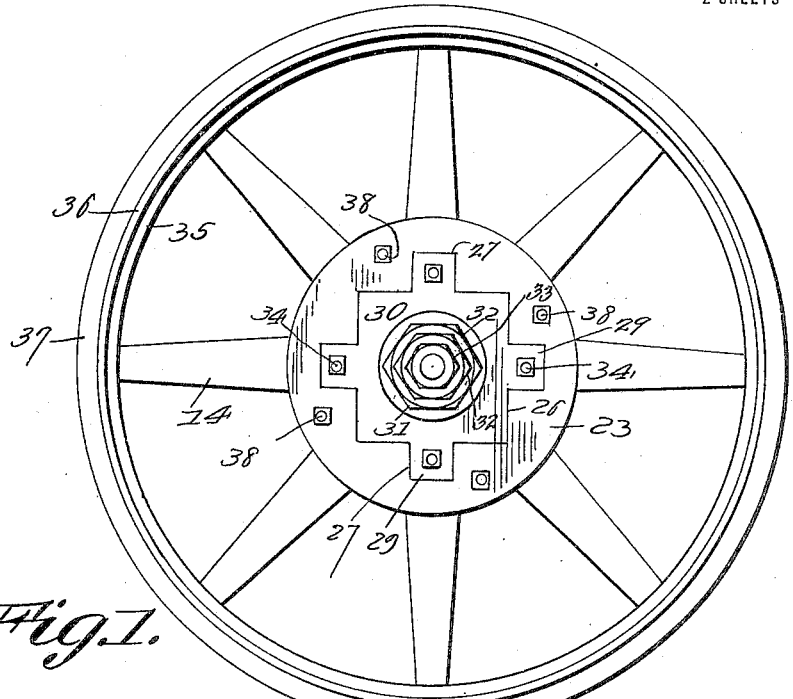
Figure 1 is a view in side elevation of the improved resilient hub constructed in accordance with the invention and as applied to a wheel.
Figure 2:
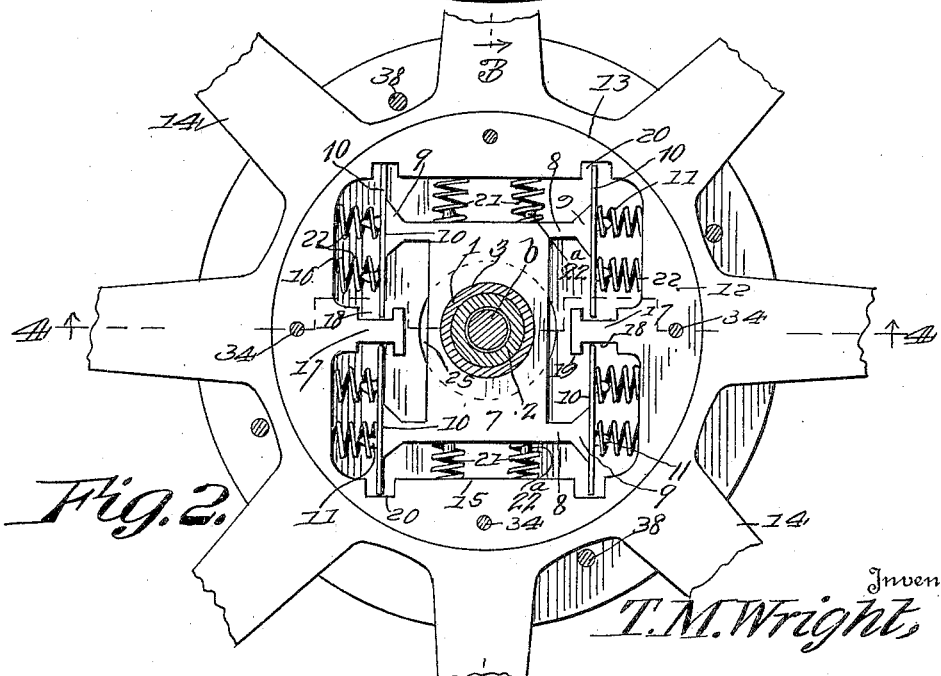
Fig. 2 is a view in side elevation with one of the hub plates removed showing the interior construction of the hub and disclosing the resilient means.

Referring more especially to the drawings, 1 designates the hub member proper, which is provided with a suitable bushing 2 of any suitable material preferably Babbitt metal. It is obvious that this bushing member may be constructed otherwise than shown. The hub member proper 1 engages through an opening 3 of a skeleton hub web 4. Adjacent the inner and outer ends, the hub member proper 1 is provided with annular grooves or channels 5 and 5ᵃ for the reception of antifrictional ball bearings 6. In other words, the antifrictional ball bearings are carried within a pair of opposed concentric rings 6ᵃ which rings are secured together in any suitable manner (not shown) and these rings are seated in the annular recesses or channels. Ball bearings of this kind are on the market and can be purchased to be employed in the manner illustrated in the drawings. While ball bearings such as disclosed are used in the present instance, it is obvious that other types of ball bearings may be employed. Furthermore, while this type of ball bearing is illustrated it is to be understood that they do not form a part of the present invention, but are simply illustrated so as to show one form of antifrictionally mounting the hub of the wheel in order to permit the same to freely rotate upon the spindle $b$ of the axle $a$.

The hub web 4 comprises the radial part 7 and the transverse end portions 8. The ends of the transverse portions 8 terminate in enlargements 9. Relatively thin metal plates 10 engage upon the enlargements 9 and are provided with lugs 11.

The hub also includes a hub ring 12, which is provided with a circular marginal edge 13 with which the spokes 14 engage. The inner ends of the spokes are integrally connected to form an annular ring to engage the hub ring 12. The hub ring has a rectangular opening 15 and the longer sides 16 of this opening are provided with radial projections 17. These projections extend inwardly and are interposed between the enlargements of the transverse portions 8 of the hub web. The opposite portions of the opposite sides of the projections 17 are cut away or notched out as at 18 and the ends of these projections 17 have enlargements 19. The plates 10 are arranged so that their adjacent ends will engage the cut away or notched out portions 18 of the projections 17. In fact, the engagement of the plates 10 with such notches are loose so as to permit the hub web and the plates 10 to move relatively to the hub ring. The shorter edges of the opening 15 of the hub ring have notches 20 which are loosely engaged by the outer ends of the plates 10, thereby acting to permit the plates 10 to move relatively to the hub ring. The notches 18 and 20 also act as guides for the plates 10. Interposed between the shorter edges of the opening 15 of the hub ring and the transverse portions 8 of the hub web are coil springs 21, thereby affording resiliency between the hub web and the hub ring, and as the hub member proper 4 is so connected to the hub web so as to yield with it, the springs 21 will yieldably support the hub member and the axle. The springs 21 engage the lugs 22$^a$ in order to hold the springs in position.

Between the opposite longer edges of the opening 15 of the hub ring and the plates 10, coil springs 22 are disposed. These springs 22 are arranged in pairs, two on each side of the projections 17. These springs 22 engage the lugs 11 which act to hold the springs in position. The shoulders of the cut away or notched out portions of the projections 17 coöperate with the ends of the plates 10 so as to limit the plates 10 in their movement radially relatively to the hub ring.

The resilient hub also includes opposite spoke retaining hub plates 23 and 24, and the spoke retaining hub plate 24 has a circular opening 25. The hub member proper 1 engages through the opening 25 which is of considerable diameter relatively to the diameter of the hub member so as to permit freedom of movement of the hub member, particularly when there is considerable weight upon the axle of the vehicle incident to the load carried thereby. The spoke retaining hub plate 23 is provided with an enlarged rectangular opening 26, the opposite edges of which have rectangular notches 27. A plate 28 engages the opening 26 and has projecting lugs 29 engaging the notches 27, to prevent movement of the plate 28 relatively to the plate 23. The plate 28 has an enlarged central opening 30 through which the outer end of the hub member proper engages. The opening 30 is of a diameter relatively larger than the hub member proper so that the hub member can have freedom of movement. An enlarged circular plate washer 31 fits the outer end of the hub member proper 4 to assist in holding the plate 28 in position, particularly until it is otherwise fastened to the hub ring. A nut 32 is threaded upon the outer end of the hub member proper and also engaging the threads of the outer end of the hub member is a lock nut 33 for holding the nut 32 in position. The lugs 29 receive suitable bolts 34, which pass through the hub ring 12 and also through the spoke retaining hub plate 24 so, as to hold the plate 28 relatively to the hub ring, and also relatively to the plate 23, since the plate 28 is movable with the plate 23. The spokes 14 are positioned between the plates 23 and 24 and are connected to the felly 35 of the wheel in any suitable manner. This felly is provided with the usual form of channel 36 for the reception of a solid rubber tire 37. Additional bolts 38 pass through the spoke retaining hub plates 23 and 24 and intermediate the spokes 14 and are provided with nuts so as to hold the parts securely together and in order to hold the spokes in contact with the circular edges of the hub ring. It will be observed that the plate 28 is removable from the outer face of the wheel in order to gain access to the interior of the hub for repairs, oiling or for otherwise adjusting the parts.

While the drawing discloses a spring wheel or resilient hub wheel especially adapted for use in connection with the spindle of a front axle it is to be understood that the construction may be equally as well embodied for a rear wheel and in providing a resilient hub wheel for a rear axle would simply involve the changing of the mounting of the hub on the rear axle and as the construction of the hub member proper 1 and the construction of the rear axle do not form any part of the present invention, the embodiment of the resilient wheel for use in connection with a rear axle would not cause a deviation from the claims. During the action of the wheel, the hub web, due to the load thereon moves radially with relation to the rectangular opening in the hub ring. When the wheel is rotating and the hub web moves, its portions 9 guide upon the plates 10, when the hub web moves in one direction, and when the hub web is so moving, the springs engaging between the hub web and certain walls of the opening act yieldably to withstand the load on the hub member proper. When the wheel is moved to another position, so that the hub web may move under the pressure of the load against the action of the springs between the plates 10 and certain other walls of the opening of the rectangular ring, the plates 10 are guided on the lugs 17 and in the recesses or notches 20. By this construction the springs 21 do not become angularly disposed, thereby preventing wear on the springs, and also do not distort the springs, as the springs 21 are unattached relatively to the wall of the opening of the hub ring.

The invention having been set forth, what is claimed as new and useful is:—

1. In a resilient hub for wheels, a hub member proper having an abutment plate at one end, a hub ring having a rectangular opening, a hub web in said opening and mounted on the hub member proper, spokes connected to the hub ring, means coöperating with the abutment plate for holding the hub web and the hub ring against axial movement relatively to each other, said hub web being movable radially relatively to the rectangular opening of the hub ring, diametrically opposite sides of the opening having inwardly projecting radial lugs, having guides, certain opposite walls of the opening at right angles to the lugs having guides, plates engaging said guides of the opening and the lugs, resilient means between said plates and certain walls of said opening, resilient means between the hub web and certain other walls of said opening, said plates constituting guides engaged by parts of the hub web, to permit the hub web to move yieldably radially relatively to the hub ring.

2. In a resilient hub for wheels, a hub member proper having an abutment plate at one end, a hub ring having a rectangular opening, a hub web in said opening and mounted on the hub member proper, coiled springs connected to two opposite edges of the hub web and engaging diametrically opposite parts of the opening of the hub ring, the opening of the hub ring at diametrically opposite portions having inwardly projecting radial lugs provided with notches, the wall of the opening of the hub ring having notches opposite the notches of the lugs, plates having their ends to move in said opposite notches, springs interposed between the plates and the wall of the opening of the hub ring, said hub web having projections engaging the adjacent faces of said plates, means engaging the opposite faces of the hub ring and overlying the hub web to retain the latter relatively to the ring, and means for retaining the hub web on the hub member proper.

In testimony whereof I hereunto affix my signature.

THOMAS M. WRIGHT.